Patented Aug. 22, 1933                                                                1,923,370

UNITED STATES PATENT OFFICE 1,923,370

GYPSUM CONCRETE MIXTURE

Waldemar C. Hansen, Westfield, N. J., assignor to American Cyanamid Company, New York, N. Y., a Corporation of Maine No Drawing. Application February 12, 1931
Serial No. 515,416

2 Claims. (Cl. 106—34)

This invention relates to gypsum-Portland cement mixtures as a set product, where such product has certain advantages and desirable characteristics over a set product of gypsum or cement alone.

Calcined gypsum when gauged with water, or mixtures in which calcined gypsum is used as a binder, sets into a mass having certain desirable properties such as strength, lightness and quickness of set, all of which have led to the large use thereof as building blocks, stucco, slabs poured-in-place constructions, and set shapes of various contours and for various purposes. However, the fact that set gypsum is slightly soluble in water and is effected by the eroding action thereof, has limited its field of use as to those circumstances where it is not subjected to the action of the atmosphere, rain, moisture, condensation, or in fact any use where a solvent liquid or liquid containing water will come in contact therewith either repeatedly or constantly.

Portland cement either alone or after mixture with sand or like material when gauged with water has come into wide use for all purposes above enumerated in connection with set gypsum products, particularly because of the strength of such set cement and its resistance to solution by water or the like and to the eroding action thereof. Its field of use however, is restricted by reason of the fact that set shapes thereof are heavy and its slowness of setting and hardening precludes the manufacture of such shapes rapidly or on automatic machinery, except where such molds may be placed aside until the mixture has set. Ordinarily cement mixtures cannot be cast upon continuous automatic machinery because due to the excessive length of time required for setting of such shapes, continuous molding devices must be very long and/or slow moving.

It is the principal object of the present invention, therefore, to secure the desirable characteristics of gypsum and cement by making set shapes from mixtures thereof with or without fillers, accelerators, retarders or the like and gauged with water.

I have discovered that calcined gypsum when mixed with Portland cement and water will set and form a structure of set gypsum having the unset cement dispersed therethru. This Portland cement then gradually sets and hardens within the gypsum structure. Such set shapes of gypsum-cement mixtures may be made having the requisite strength, desirable lightness and quickness of set, and such set material will be satisfactorily resistant to the solvent and/or eroding action of water or like liquids.

In practicing the invention, I may make use of a mixture of gypsum and cement in proportions ranging from 5% to 95% of the former to 95% to 5% of the latter with or without fillers, accelerators, retarders, either as a shape having a uniform composition, or as an adhering layer or veneer upon a base of gypsum, cement, or any other material to which the mixture will bond. The invention may be made in the form of stucco, blocks, slabs, sanded mixtures, poured-in-place constructions, statuary, protecting layers or coverings, usually subjected to repeated or continuous wettings such as oil tank coverings, or any other form in which a light material is desired which will efficiently resist the solvent or erosion action of water.

My experiments have shown that reasonable strength may be secured by mixing from 5% to 95% of calcined gypsum with from 95% to 5% Portland cement and a necessary amount of water to cause hydration and setting of the mix, and that such strength is favorably comparable with the strength of either materal alone, reference being made to the following table:

| % Cement | % Gypsum | Tensile strength— lbs. per sq. in. |
|---|---|---|
| 100 | --- | 580 |
| --- | 100 | 460 |
| 95 | 5 | 580 |
| 90 | 10 | 580 |
| 80 | 20 | 470 |
| 75 | 25 | 520 |
| 60 | 40 | 480 |
| 50 | 50 | 500 |
| 40 | 60 | 530 |
| 30 | 70 | 440 |
| 25 | 75 | 500 |
| 20 | 80 | 450 |
| 10 | 90 | 360 |

The above specimens were all broken wet.

Portland cement products develop their maximum strength only if cured in a moist atmosphere or in water for some time after manufacture, while gypsum products, on the other hand, may be dried out at once after manufacture. Products made from mixtures of cement and gypsum give greater strength when cured in a moist atmosphere or in water for a day or more before they are allowed to dry then if dried at once. This fact is shown in the following table:

| Cement | Gypsum | Days in moist air | Days in water | Days in dry air | Broken | Tensile strength lbs. per sq. in. |
|---|---|---|---|---|---|---|
| 60 | 40 | 0 | 0 | 14 | Dry | 190 |
| 60 | 40 | 1 | 0 | 13 | Dry | 350 |
| 60 | 40 | 1 | 1 | 5 | Dry | 420 |
| 60 | 40 | 1 | 54 | 2 | Dry | 440 |
| 60 | 40 | 1 | 56 | 0 | Wet | 460 |
| 60 | 40 | 1 | 1 | 52 | Dry | 480 |

Immersion tests on briquettes of these mixtures show that admixtures of cement and gypsum are far superior in resisting the solvent or eroding action of water than gypsum alone, as shown by the following table;

| % Cement | % Gypsum | Briquette wt. dry | Briquette wt. after immersion | Briquette wt. after 47 days' drying |
|---|---|---|---|---|
| 0 | 100 | 74 | 90 | 47 |
| 20 | 80 | 82 | 97 | 94 |
| 30 | 70 | 78 | 95 | 95 |
| 35 | 65 | 73 | 90 | 93 |
| 50 | 50 | 75 | 98 | 99 |

This table clearly indicates that cement prevents solution of the specimens.

I prefer a cement gypsum mixture containing from 50% to 80% of gypsum, the rest being principally Portland cement, where water resistance is of prime consideration.

Where a shape is desired having both optimum strength and water resistance, a proportion of gypsum to cement should be probably about 50—50 as this has been found to be entirely satisfactory for most purposes.

Such products are reasonably light, and have a quickness of set, making it possible economically to manufacture shapes therefrom on automatic machinery.

Obviously such fillers as sand or asbestos may be used where the binder is present in such proportions as to maintain the desirable characteristics of the combination.

Such products may be of either uniform mixtures or made as an adherent layer or veneer upon a base of gypsum, cement, metal or wood lath, or in fact any material where a physical or chemical bond may be had.

While the invention has been described with particularity, yet obviously I do not wish to be limited strictly thereto, but the invention is to be construed broadly and limited only by the scope of the claims.

I claim:

1. A set mass in which the binder consists of from 20% to 50% Portland cement, and from 80% to 50% calcined gypsum, the mix having been gauged with the requisite amount of water to cause setting, and an inert filler, the set mass being strong, light, substantially insoluble and characterized by its inherent quickness of set as compared with Portland cement, and more insoluble than set gypsum alone.

2. A set mass in which the binder consists of from 20% to 50% Portland cement, and from 80% to 50% calcined gypsum, the mix having been gauged with the requisite amount of water to cause setting, the set mass being strong, light, substantially insoluble and characterized by its inherent quickness of set as compared with Portland cement, and more insoluble than set gypsum alone.

WALDEMAR C. HANSEN.